United States Patent [19]

Kienzle et al.

[11] 3,767,442

[45] Oct. 23, 1973

[54] PHTHALOCYANINES

[75] Inventors: Jean André Paul Kienzle; Michel Ernest Antoine Huille, both of Creil; Louis Antoine Cabut, Nogent S/Oise, all of France

[73] Assignee: Ugine Kuhlmann, Paris, France

[22] Filed: Nov. 22, 1971

[21] Appl. No.: 201,201

[30] Foreign Application Priority Data
Nov. 20, 1970 France .................. 7041759

[52] U.S. Cl. .................. 106/288 Q, 260/314.5
[51] Int. Cl. .................. C08h 17/14
[58] Field of Search .................. 106/288 Q

[56] References Cited
UNITED STATES PATENTS
3,646,003  2/1972  Lamure .................. 106/288 Q FOREIGN PATENTS OR APPLICATIONS
758,485  5/1967  Canada .................. 106/288 Q
949,739  2/1964  Great Britain .................. 106/288 Q Primary Examiner—Delbert E. Gantz
Assistant Examiner—James W. Hellwege
Attorney—Francis C. Browne et al.

[57] ABSTRACT

A phthalocyanine pigment mixture which contains a compound of the formula:

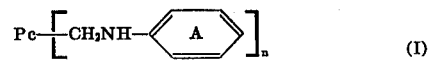

(I)

in which Pc represents a phthalocyanine residue, the benzene nucleus A is substituted by at least one alkyl group having up to four carbon atoms, and $n$ is a whole number from 1 to 4; process for the stabilisation of phthalocyanine pigments which comprises incorporating therewith at least one compound of formula (I); and paints, lacquers, enamels and plastic materials coloured by means of a phthalocyanine pigment mixture containing a compound of formula (I).

13 Claims, No Drawings

PHTHALOCYANINES

The invention relates to phthalocyanine pigment mixtures which are stable towards crystallisation.

It is known that the α form of copper phthalocyanine has the disadvantage of crystallising. The crystallisation or growth of the crystals takes place slowly in the cold and rapidly in the hot on contact with aromatic hydrocarbons. For example, in a paint kept in a can and containing such solvents, the micro-crystals of the pigment are slowly changed into larger crystals with a considerable loss of colouring power. This phenomenon constitutes an objection against the use of this substance in inks, paints and plastics. The crystallisation of the α form represents a change into the more stable β form. The reduction in the colouring power is due to the relatively large dimensions of the slowly developed crystals of β form. In addition, since the β form is greener than the α form, an alteration of shade is observed at the same time.

With the object of making the α form of copper phthalocyanine non-crystallising, it has been proposed to stabilise it by mixing it with another metallic phthalocyanine or by coating the particles with colourless protecting substances. This coating, however, often involves a reduction of the colouring power.

It has now been found that the crystallisation can be prevented by mixing phthalocyanines with a compound of the general formula:

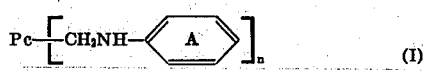

(I)

in which Pc represents a phthalocyanine residue, the benzene nucleus A is substituted by at least one alkyl group having up to four carbon atoms and n is a whole number from 1 to 4.

The phthalocyanine of residue Pc may or may not be metallised. The phthalocyanine of the residue Pc may be copper phthalocyanine in its α or β form or a halogenated phthalocyanine derivative especially a chlorinated derivative containing up to 4 percent of chlorine. Examples of compounds of the general formula (I) include tris-(p-toluidinomethyl)-copperphthalocyanine, tris-(xylidinomethyl)-copperphthalocyanine, and monochlorinated tris-(p-toluidinomethyl)-copperphthalocyanine.

The compounds of formula (I) may be obtained by reacting a chloromethylated phthalocyanine with an amine of the general formula:

(II)

in which A is as defined above.

The incorporation of at least one stabilising phthalocyanine of formula (I) in the phthalocyanine or phthalocyanines to be stabilised may be effected by simple mixing of the two types of phthalocyanines (a) in an aqueous suspension at ambient temperature, followed by filtration, draining and drying, or (b) by dry grinding in the presence of a salt, taking up in hot water to remove the salt and filtering, or (c) by kneading the press-pastes with the stabilising phthalocyanine, or (d) by partial chloromethylation of the phthalocyanine to be stabilised, then reacting with an amine of the formula (II).

The amount of the compound of formula (I) preferably incorporated is 1 to 20 percent by weight based on the total weight of pigment to be stabilised plus the compound of formula (I).

The mixtures of α copper phthalocyanine and/or monochlorinated β copper phthalocyanine with at least one compound of formula (I) do not crystallise in the solvents and are stable to flocculation in varnishes and paints. They also have the advantage of having good resistance to leaching out of the mixture by solvents, which was quite unexpected taking into account the solubility of the compounds of formula (1) in aromatic solvents such as xylene or toluene.

They are also fast to overvarnishing. This property is verified by the absence of migration of pigments into white paint used to mask an area coloured with a paint based on phthalocyanine.

The following Examples, in which the parts and percentages are by weight, illustrate the invention without restricting it.

EXAMPLE 1

Forty parts of the β form of copper phthalocyanine (Colour Index 74,160) are suspended in 200 parts of chlorosulphonic acid and 100 parts of 96 percent sulphuric acid. 80 parts of paraformaldehyde are added at 90° to 95°C and the mixture is heated at 90° to 95°C for about 2 hours. It is left to cool to ambient temperature and then poured on a mixture of water and ice. The precipitate formed is filtered off, washed until the washings are neutral and dried at 40° to 50°C.

A product is obtained with a chlorine content of 14.55 percent which corresponds to tris-(chloromethyl)-copper phthalocyanine.

Twenty-five parts of this compound are mixed with 100 parts of paratoluidine. The mixture is heated to 95° to 100°C with stirring until a sample upon dilution with alcohol, filtration and washing with water no longer contains chlorine. After heating for 15 hours, the reaction is practically complete. The product is run into a mixture comprising 100 parts of concentrated hydrochloric acid and 300 parts of water, the solid filtered off, washed with water until neutral and dried. 29.5 parts of a blue product free from chlorine are obtained. The proportion of nitrogen in the product corresponds to that in tris-(4-methyl-phenylaminomethyl)-copper phthalacyanine.

Analysis: N calculated for $C_{56}H_{33}N_{11}Cu$ 16.52%
Found 15.9%

Five parts of tris-(4-methyl-phenylaminomethyl)-copper phthalocyanine are added to a suspension of 100 parts of copper phthalocyanine (Colour Index 74,160) obtained in the α form by dissolving the crude phthalocyanine (β form) in sulphuric acid and reprecipitating in water. This suspension is stirred for several hours at the ambient temperature. The pigment mixture is filtered off, drained and dried. The dry pigment is easily reduced to a soft powder. The examination of its stability is effected as follows:

1 g of the pigment mixture is dispersed in 10 ml of xylene and the dispersion refluxed for 2 hours. After cooling, the product is separated by filtration and dried after washing with ethanol. The X-ray diagram shows that the pigment mixture still consists of 100 percent of the α form. During the same test the α form of the copper phthalocyanine (as pure product) recrystallises completely in the form of large needles of the β form when the methylphenylamino-methylated derivative is not present.

In addition to its good stability towards crystallisation, this pigment has a good stability towards flocculation. Verification of this is effected as follows:

One part of pigment mixture is dispersed in 100 parts of nitrocellulose varnish and 10 parts of this dispersion are mixed with 25 parts of white paint containing a pigment with a titanium oxide base. The coloured suspension, stored in a glass cylinder, undergoes no modification in intensity at the end of several weeks, although the phthalocyanine obtained under the same conditions in the form of the pure produce and applied in the same way gives a suspension which is decolourised at the end of a few days.

EXAMPLE 2

10 parts of tris-(chloromethyl)-copper phthalocyanine are added to 50 parts of mesidine. The mixture is heated at 90° to 95°C with stirring for about 20 hours. It is allowed to cool to 50° to 60°C and diluted with acetone. The phthalocyanine derivative is filtered off, washed with acetone, then with water and dried. 12.8 parts of a product which only contains small traces of chlorine are obtained. The proportion of nitrogen in the product corresponds to that in tris-(2,4,6-trimethyl-phenylaminomethyl)-copper phthalocyanine.

Analysis: N calculated for $C_{56}H_{37}N_{11}Cu$ 16.04%
Found 15.4%

A mixture comprising 125 parts of crude copper phthalocyanine (β form), 100 parts of monochloro-copper phthalocyanine (Colour Index 74,250, β form), 25 parts of tris-(2,4,6-trimethyl-phenylaminomethyl)-copper phthalocyanine and 1,000 parts of sodium sulphate is ground in a ball mill for about 40 hours.

The ground mass is stirred into 10,000 parts of hot water, filtered off, washed until the salt is completely eliminated, and dried. A pigment mixture stable to recrystallisation and flocculation in paints is obtained.

Example 3

100 parts of press paste of the β form of copper phthalocyanine, containing 25 parts of dry pigment, is intimately kneaded with 1 part of tris-(2,6-dimethyl-phenylaminomethyl)-copperphthalocyanine. The mixture is dried at 60°C. and then reduced to a fine powder.

Compared with the pigment from the same pressed paste without the tris-methylated derivative, this pigment composition has an improved resistance to the growth of crystals on contact with organic solvents.

Example 4

A mixture comprising 240 parts of crude copper phthalocyanine (β form), 10 parts of tris-(4-methyl-phenylaminomethyl)-copper phthalocyanine, 1,000 parts of a water-soluble mineral salt such as sodium sulphate or calcium chloride and 50 parts of trichloroethylene is ground in a ball mill for 48 hours.

The mixture is taken up in 30,000 parts of hot water and filtered. A pigment of the β form is obtained which, compared with the crude phthalocyanine without the tris-methylated derivative, has an excellent resistance to recrystallisation in boiling xylene.

Example 5

95 parts of a non-chlorinated copper phthalocyanine pigment (α form), which is obtained by grinding a crude phthalocyanine with sodium sulphate, and 5 parts of tris-(4-methyl-phenylaminomethyl)-copper phthalocyanine are mixed for 10 hours. The resulting pigment is stable to increase in crystallinity in the organic solvents. In addition, it has good rheological properties when it is incorporated into inks for helioengraving.

Example 6

240 parts of a crude copper phthalocyanine containing 2.8 percent of chlorine and 1,000 parts of sodium sulphate are ground in a ball grinder for 48 hours. The ground mass is diluted in 10,000 parts of warm water and, 10 parts of tris-(2,6-dimethyl-phenylaminomethyl) copper phthalocyanine are added. The product is filtered, washed until the salt is completely eliminated and dried. A pigment is obtained which, compared with that obtained under the same conditions in the absence of tris-(2,6-dimethyl-phenylaminomethyl)-copper phthalocyanine, shows an improved resistance to increase in crystallinity in xylene and to flocculation in painting.

We claim:

1. A phthalocyanine pigment mixture which contains a compound of the formula:

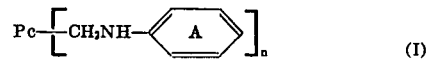

in which Pc represents a phthalocyanine residue, the benzene nucleus A is substituted by at least one alkyl group having up to four carbon atoms, and $n$ is a whole number from 1 to 4.

2. A mixture as claimed in claim 1 wherein $n$ is 3 or 4 in formula (I).

3. A mixture as claimed in claim 1 wherein the residue Pc is copper phthalocyanine in its α- or β- form.

4. A mixture as claimed in claim 1 wherein the residue Pc is a halogenated phthalocyanine derivative.

5. A mixture as claimed in claim 1 which comprises α copper phthalocyanine and a compound of formula (I).

6. A mixture as claimed in claim 1 which comprises the monochloro derivative of α copper phthalocyanine and a compound of formula (I).

7. A mixture as claimed in claim 1 which comprises 95 percent of copper phthalocyanine in a α form and 5 percent of tris-(4-methyl-phenylaminomethyl)-copper phthalocyanine.

8. The mixture comprising 96 percent of copper phthalocyanine in β form and 4 percent of tris-(4-methyl-phenylaminomethyl)- copper phthalocyanine.

9. A mixture as claimed in claim 1 which comprises 25 parts of copper phthalocyanine in β form and 1 part of tris-(2,6-dimethyl-phenylaminomethyl)-copper phthalocyanine.

10. A mixture as claimed in claim 1, wherein there is 1 to 20 percent, based on the total weight of pigment to be stabilised plus the compound of formula (I), of the compound of formula (I) as defined in claim 1.

11. A process for the stabilisation of phthalocyanine pigments which comprises incorporating therewith at least one compound of the formula:

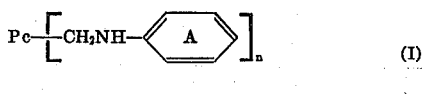
(I)

in which Pc represents a phthalocyanine residue, the benzene nucleus A is substituted by at least one alkyl group having up to four carbon atoms, and $n$ is a whole number from 1 to 4.

12. A process as claimed in claim 11 wherein the phthalocyanine pigment and compound of formula (I) are mixed in aqueous suspension at the ambient temperature, filtered, and dried.

13. A process as claimed in claim 11 wherein the dry phthalocyanine pigment and the compound of formula (I) are ground in the presence of a water-soluble mineral salt, the mixture dispersed in hot water and filtered.

* * * * *